United States Patent
Ali et al.

(10) Patent No.: US 8,160,936 B2
(45) Date of Patent: Apr. 17, 2012

(54) PATRIOTIC AMERICAN SHOPPING NETWORK

(76) Inventors: Kamruddin Imtiaz Ali, Ocoee, FL (US); Joan Fareeda Ali, Ocoee, FL (US)

(*) Notice: Subject to any disclaimer, the term of this patent is extended or adjusted under 35 U.S.C. 154(b) by 305 days.

(21) Appl. No.: 12/404,342

(22) Filed: Mar. 16, 2009

(65) Prior Publication Data
US 2009/0313088 A1    Dec. 17, 2009

Related U.S. Application Data

(60) Provisional application No. 61/069,743, filed on Mar. 17, 2008.

(51) Int. Cl.
*G06Q 30/00* (2012.01)
*G06F 17/30* (2006.01)
(52) U.S. Cl. ............ 705/26.61; 705/26.1; 705/27.1
(58) Field of Classification Search ............ 705/26.61
See application file for complete search history.

(56) References Cited

U.S. PATENT DOCUMENTS

| | | | |
|---|---|---|---|
| 2006/0064411 A1* | 3/2006 | Gross et al. | 707/3 |
| 2007/0299736 A1* | 12/2007 | Perrochon et al. | 705/26 |
| 2008/0071775 A1* | 3/2008 | Gross | 707/5 |
| 2008/0183574 A1* | 7/2008 | Nash et al. | 705/14 |
| 2009/0132341 A1* | 5/2009 | Klinger et al. | 705/10 |

OTHER PUBLICATIONS

"DOE/EPA Announce Fuel Economy Leaders for Model Year 2005." US Newswire. Oct. 7, 2004. [recovered from Dialog on Jan. 25, 2012].*

* cited by examiner

*Primary Examiner* — Will Allen
*Assistant Examiner* — Kathleen G Palavecino
(74) *Attorney, Agent, or Firm* — Michael D. Eisenberg

(57) ABSTRACT

Variants of the invention are directed to Internet-based shopping networks which provide information to consumers who desire to purchase locally-produced or locally-manufactured products or services. In one variant, an Internet-based shopping network utilizes a website home page to interface with consumers. The website home page may include consumer-oriented components such as a product search component, a product rank component and/or a product purchase component. The network may include vendor-oriented components such as hyperlinks to predetermined vendors based on products offered by the predetermined vendor and the percentage of sales that is returned by the vendor for recirculation within a local economy.

14 Claims, 3 Drawing Sheets

| Product | Description | Price | Product Rank | Vendor Hyperlink | Vendor Rank |
|---|---|---|---|---|---|
|  | high-top shoe, mens | $$ | 👟👟 | www.vendor1.com | 👟 |
|  | comfort shoe, womens | $$$ | 👟👟👟👟 | www.vendor2.com | 👟👟👟 |
|  | high-top show, mens | $$ | 👟 | www.vendor3.com | 👟👟 |

# PATRIOTIC AMERICAN SHOPPING NETWORK

CROSS-REFERENCES TO RELATED APPLICATIONS

This application claims priority from U.S. Provisional Application Ser. No. 61/069,743 filed on Mar. 17, 2008 which is hereby incorporated herein by reference in its entirety.

FIELD OF INVENTION

Internet-based shopping networks.

BACKGROUND OF THE INVENTION

Internet-based shopping networks have been in use since the public introduction to the world-wide web. Conventional Internet-based shopping networks include on-line retailers such as, for example, amazon.com, nextag.com, smartbargains.com and shopping.com. For a given product, conventional Internet-based shopping networks typically provide information such as price, availability, photographs of the product, product features, product description and/or customer reviews.

Information about the origin of a given product is typically not available on conventional Internet-based shopping networks. Thus, if a consumer is interested in buying locally-produced or locally-manufactured products, the consumer does not usually have access to this information to make an informed purchasing decision using conventional Internet-based shopping networks. For example, a consumer may be interested in buying locally-produced or locally-manufactured products because the quality and safety standards in that consumer's country of origin are higher relative to countries outside of the consumer's country of origin. Thus, while a given product displayed and sold on conventional Internet-based shopping networks may appear more cost-effective relative to locally-produced or locally-manufactured products, the cost may be actually higher when taking into consideration higher quality and safety standards of that consumer's country of origin. Additionally, such uninformed purchasing decisions tend to drive local producers out of business.

Information about the distribution of revenue from the sale of a given product also is typically not available on conventional Internet-based shopping networks. For example, conventional Internet-based shopping networks do not offer consumers a guide to the percentage of overall or product-specific sales revenue, from consumer product purchases, that will be retained by the vendor or their employees for recirculation within a local economy. Similarly, conventional Internet-based shopping networks may offer consumers products where a large percentage of overall or product-specific sales revenue, from consumer product purchases, will be retained by the vendor or their employees for circulation outside of a local economy. Thus, the consumer who desires locally-produced or locally-manufactured products (or services) may not have the needed information to make an informed purchasing decision using conventional Internet-based shopping networks. Additionally, such uninformed purchasing decisions tend to drive local producers out of business.

SUMMARY OF THE INVENTION

A computer method of processing a search query result, including: (a) identifying a plurality of predetermined products offered by a plurality of predetermined vendors in response to a search query submitted from a computing device; (b) determining a ranking of the identified predetermined products based on a percentage of overall or product-specific sales revenue, from consumer product purchases, that will be retained by the vendor or employees of the vendor for recirculation within a local economy; and (c) providing a results page wherein each identified predetermined product is displayed with the determined ranking as a list is herein disclosed.

When providing the results page, at least one of an image, a price or a hyperlink corresponding to each identified predetermined product may be displayed adjacent the identified predetermined product. The computer method may further include a means to effectuate a purchase of an identified predetermined product via the corresponding hyperlink. When providing the results page, the ranking corresponding to the identified predetermined product offered by the predetermined vendor may be displayed as a graphical or a numerical ranking, the ranking displayed adjacent the identified predetermined product. The graphical ranking may include an American flag, if displayed, and the numerical ranking may be from between 0 to 20.

An Internet-based shopping network, including: (a) a product search component providing a list of products matching consumer search criteria available from one or more vendors for Internet purchase, the list provided in response to a search query; (b) a product rank component providing a ranking for each identified predetermined products in the list based on at least one of (i) a percentage of overall sales revenue or (ii) product-specific sales revenue, from consumer product purchases, wherein the revenue is retained by the vendor or employees of the vendor for recirculation within a local economy; and (c) a product purchasing component providing a means to purchase predetermined products in the list is herein disclosed.

The product search component may include a local or remote vendor database and a local or remote product database, the vendor and product databases having data corresponding to at least one of (i) the percentage of overall sales revenue or (ii) product-specific sales revenue, from consumer product purchases, wherein the revenue is retained by the vendor or employees of the vendor for recirculation within the local economy. The product rank component may include a local or remote rank database, the rank database to assign a rank to a vendor or a product within the vendor and product databases based on data corresponding to at least one of (i) the percentage of overall sales revenue or (ii) product-specific sales revenue, from consumer product purchases, wherein the revenue is retained by the vendor or employees of the vendor for recirculation within the local economy. The ranking may be displayed as a graphical or a numerical ranking, the ranking displayed adjacent each product. The graphical ranking may include an American flag, if displayed, and the numerical ranking may be from between 0 to 20. The product purchase component may provide means to purchase a predetermined product from the Internet-based shopping network itself. The product purchase component may provide at least one hyperlink in communication with at least one vendor website to allow purchase of a predetermined product sold by the vendor.

A program product for use in a computer system that executes program steps recorded in a computer-readable media to perform a computer method of processing a search query result, including: (a) a recordable media; and (b) a program of computer-readable instructions executable by the computer system to perform operations including: (i) identifying a plurality of predetermined products offered by a plurality of predetermined vendors in response to a search query submitted from a computing device; (ii) determining a ranking of the identified predetermined products based on a percentage of overall or product-specific sales revenue, from consumer product purchases, that will be retained by the vendor or employees of the vendor for recirculation within a local economy; and (iii) providing a results page wherein each identified predetermined product is displayed with the determined ranking as a list is herein disclosed.

When providing the results page, at least one of an image, a price or a hyperlink corresponding to each identified predetermined product may be displayed adjacent the identified predetermined product. The program product may further include a means to effectuate a purchase of an identified predetermined product via the corresponding hyperlink. When providing the results page, the ranking corresponding to the identified predetermined product offered by the predetermined vendor may be displayed as a graphical or a numerical ranking, the ranking displayed adjacent the identified predetermined product. The graphical ranking may include an American flag, if displayed, and the numerical ranking may be from between 0 to 20.

A system for providing information to a consumer, including: (a) providing an interactive website with a means for a consumer to search products for sale over the Internet, the products selected from a plurality of predetermined vendors offering the products for sale; (b) providing a results page wherein each identified product resulting from a consumer search is displayed in a list, the list having at least one of a product description, a product image, a product price, a vendor name, or a hyperlink to the vendor; and (c) providing a ranking of each identified product based on a percentage of overall or product-specific sales revenue, from consumer product purchases, that will be retained by the vendor or employees of the vendor for recirculation within a local economy is herein disclosed.

The ranking corresponding to the predetermined vendor offering the identified product may be displayed as a graphical or a numerical ranking, the ranking displayed adjacent the identified product. The graphical ranking may include an American flag, if displayed, and the numerical ranking may be from between 0 to 20.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention.

Variants of the invention are directed to Internet-based shopping networks which provide information to consumers who desire to purchase locally-produced or locally-manufactured products or services. In one variant, an Internet-based shopping network utilizes a website home page to interface with consumers. The website home page may include consumer-oriented components such as a Product Search Component, a Product Rank Component and/or a Product Purchase Component. The network may include vendor-oriented components such as hyperlinks to predetermined vendors based on products offered by the predetermined vendor and the percentage of sales that is returned by the vendor for recirculation within a local economy.

Figure 1:
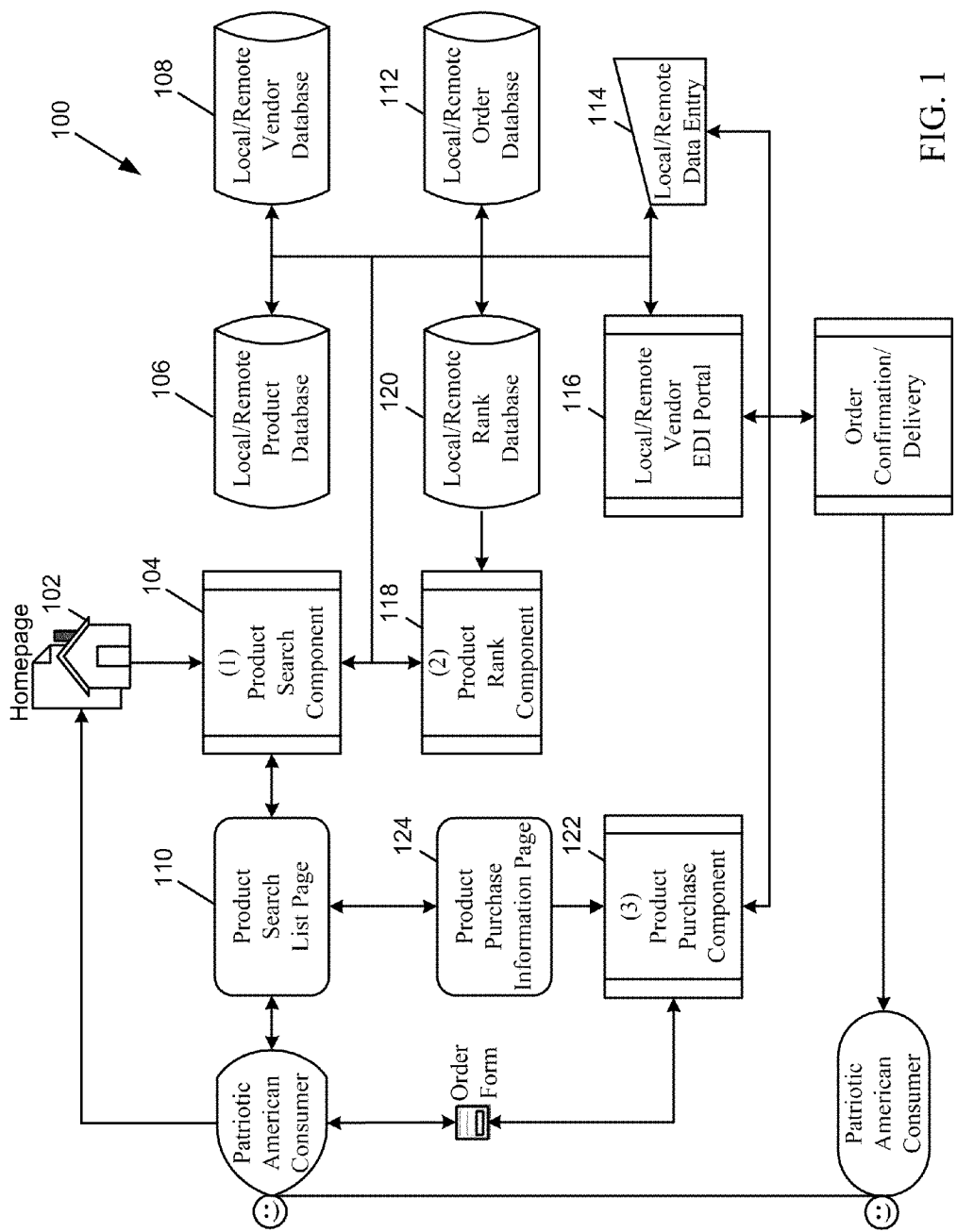
FIG. 1 illustrates schematically a localized Internet-based shopping network according to a variant of the invention.

FIG. 1 illustrates schematically a localized Internet-based shopping network according to a variant of the invention. As shown, an Internet-based shopping network 100 includes a website home page 102 displayed on a computer screen to interface with consumers. Website home page 102 may be of any layout, typographic and color-scheme such as those known by one of ordinary skill in the art. In one variant, website home page 102 includes consumer-oriented components such as, but not limited to, a Product Search Component, a Product Rank Component and/or a Product Purchase Component. The consumer-oriented components may be dynamic or static.

Figure 2:
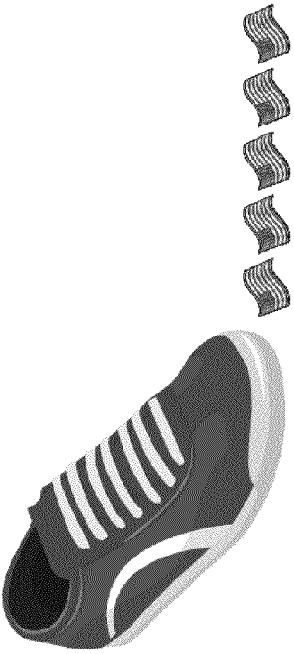
FIG. 2 illustrates a product search page of a localized Internet-based shopping network according to a variant of the invention.
Figure 3:
FIG. 3 illustrates a product purchase information page of a localized Internet-based shopping network according to a variant of the invention.
Figure 3:
Figure 3:

In one variant, a Product Search Component 104 provides a means for a consumer to search for products for purchase by vendors meeting predetermined criteria, e.g., percentage of overall or product-specific sales revenue, from consumer product purchases, that will be retained by the vendor or their employees for recirculation within a local economy. Product Search Component 104 may be dynamic and interactive. For example, Product Search Component 104 may include an Internet website search box that is displayed on the computer screen and allows entry and processing of consumer search criteria to locate matching products based on key words (see FIG. 2). In one variant, the consumer may narrow a product search by first selecting a category from a predetermined drop down list (e.g., via a hyperlink) followed by entering key words into a search box. Once the key words are input and the consumer selects "Search", a list of matching products selected from a local or remote Internet Product Database 106 and/or a local or remote Internet Vendor Database 108 linked to the network 100 will be built and displayed on a webpage with hyperlinks (see FIG. 3), providing the ability to select desired products and complete purchase online or via alternative means. The list may include, but is not limited to, product description/image, product price/rank, and vendor name/rank information, and may be sorted by price, rank, vendor or a combination thereof.

Generally, Product Search Component 104 allows for a list of products matching consumer search criteria, e.g., a Product Search List Page 110 available from one or more vendors for Internet purchase, with the ability to complete purchase online via a local or via remote Order Database 112 or via other means. Generally, Product Search Component 104 may build the product list based on matching consumer search criteria entered in the search box of the website home page 102, or based on a series of search filters, presented as List/Selection Boxes, Category Menus/Sub-menus, etc., that restrict the matches to specific product lines, vendors, prices ranges, product/vendor ranks, etc. Generally, the Internet Website Product/Vendor Databases 106, 108 may be built, maintained, and accessed locally, using manual data entry (numerical reference 114) or electronic data interchange (EDI) via a remote Internet Portal 116 or any combination of these or other methods.

In one variant, a Product Rank Component 118 provides a consumer with a "rank" of a vendor(s) offering products for purchase, or of the product(s) offered for purchase by the vendor(s), wherein the rank is based on predetermined criteria. The rank of a particular product or vendor may be based on the percentage of overall or product-specific sales revenue, from consumer product purchases, that will be retained by the vendor or their employees for recirculation within a local economy. Once key words are input in the search box and the consumer selects "Search" on the website home page 102, a list of matching products selected from Internet Product Database 106 and/or Internet Vendor Database 108 will be built and displayed on a webpage with a rank generated from a local or remote Internet Rank Database 120 wherein the rank is based on the percentage of overall or product-specific sales revenue, from consumer product purchases, that will be retained by the vendor or their employees for recirculation within a local economy.

Product Rank Component 118 may be both static and dynamic. Product Rank Component 118 may be static with respect to the rank information provided to the consumer in any given search. However, Product Rank Component 118 may be dynamic with respect to the rank assigned to each product or vendor over time. For example, if a vendor uses all local manufacturers and suppliers to manufacture its product, the product sold by the vendor may rank higher. If the vendor subsequently begins outsourcing outside of local manufacturers and suppliers to manufacture its product, the product sold by the vendor may subsequently rank lower.

In one variant, Product Rank Component 118 is based on an algorithm, i.e., a "Product Ranking Algorithm." For example, in an Internet-based shopping network focusing on U.S.-based products, the following Product Ranking Algorithm may be used:

1. Manufacturer 0% U.S.-owned=0 points, 1 to 49%=1 point, 50 to 99%=2 points, 100%=3 points.
2. Manufacturer 0% U.S. labor=0 points, 1 to 49%=1 point, 50 to 99%=2 points, 100%=3 points.
3. Manufacturer 0% U.S. materials=0 points, 1 to 49%=1 point, 50 to 99%=2 points, 100%=3 points.
4. Distributor 0% U.S.-owned=0 points, 1 to 49%=1 point, 50 to 99%=2 points, 100%=3 points.
5. Distributor 0% U.S. labor=0 points, 1 to 49%=1 point, 50 to 99%=2 points, 100%=3 points.
6. Vendor 0% U.S.-owned=0 points, 1 to 49%=1 point, 50 to 99%=2 points, 100%=3 points.
7. Vendor 0% U.S. labor=0 points, 1 to 49%=1 point, 50 to 99%=2 points, 100%=3 points.

"Product Rank Points" equals the Sum of Assigned Points divided by Available Points multiplied by Scaling Factor. For example, if fourteen (14) of the available twenty-one (21) points were assigned in steps 1-7, and Product Rank is displayed as a graphical representation of between zero (0) to five (5) units, this equation would yield 14/21*5=3.33 Product Rank Points.

In one variant, a Vendor Ranking is based on an algorithm, i.e., "Vendor Ranking Algorithm." For example, in an Internet-based shopping network focusing on U.S.-based products, the following Vendor Ranking Algorithm may be used. "Vendor Rank Points" equals the Sum of (Offered Product Rank Points) divided by Number of Offered Products.

In an Internet-based shopping network focusing on, e.g., U.S.-based products, these Ranking Algorithms provide a granularity that is highly indicative of whether the purchase of a specific Product from a specific Vendor, and the Vendor Offerings overall, make a zero, minor, major, or total revenue contribution to the local economy of the U.S.A., using data that should be available within the public domain.

The methods that are used by other "Buy American" entities to offer products to patriotic American consumers rely on a Product marked as "Made In America" or sold by a "U.S.-owned Business", and do not address the nuances of a Product made in America of partially-imported materials by a wholly foreign-owned Manufacturer with a mostly U.S. labor force, distributed by a mostly U.S.-owned Distributor with a partial foreign labor force, and sold by a partially U.S.-owned Vendor with a mostly foreign labor force, for example, and provide much less granularity for indicating whether the purchase of a specific Product from a specific Vendor, and the Vendor Offerings overall, make a zero, minor, major, or total revenue contribution to the local economy of the U.S.A.

Generally, the rank of matching Products/Vendors compiled from the Internet Website Product/Vendor/Rank Databases 106, 108, 120 will be integrated into the list built and displayed as an Internet webpage(s) (following a product search) which includes hyperlinks as Product/Vendor Rank information. Generally, the Product/Vendor Rank information may be presented as a numerical/graphical representation of the percentage of overall or product-specific sales revenue, from consumer product purchases that will be retained by the vendor or their employees for recirculation within the local economy. Generally, the Internet Website Product/Vendor/Rank Databases 106, 108, 120 may be built, maintained, and accessed locally, using manual data entry or EDI, via a remote Internet Portal, or any combination of these or other methods.

In one variant, a Product Purchase Component 122 provides a means of purchasing products chosen from a list of products built and displayed as an Internet webpage (see FIG. 3) with hyperlinks associated with each product displayed. Selection of a hyperlink will result in the display of an Internet Website Product Purchase Page 124, which will present additional product and purchasing information and allow the consumer to order the desired products for purchase. Products chosen for purchase will be stored in an Internet Website Product Order Database 112. Generally, the Product Search Component 104 may build the product list based on matching consumer search criteria entered in the Internet Website Search Box on the website home page 102, or based on a series of Search Filters, presented as List/Selection Boxes, Category Menus/Sub-menus, etc., that restrict the matches to specific product lines, vendors, prices ranges, product/vendor ranks, etc. (also on the website home page 102). The Internet Website Product Order Database 112 may be built, maintained, and accessed locally, using manual data entry or EDI, via a remote Internet Portal, or any combination of these or other methods.

According to one variant of the invention, an Internet-based shopping network facilitates recirculation of product-specific sales revenue within a local economy, e.g., the United States of America, based on consumer product purchases. The Internet-based shopping network may be accessible by one or more Internet Websites, such as BuyOurUSA.com or BuyOurAmerica.com, promoting the concept of BUY OUR COUNTRY BACK™ to patriotic American consumers, which may be supplemented by other tangible or intangible sales media, such as retail store, postal mail, electronic mail, television or telephone promotions to purchase U.S.-focused goods using the Internet-based shopping network, and which will allow American consumers to search for and purchase products from one or more vendors, based on both the product price and percentage of overall or product-specific sales revenue, from consumer product purchases, that will be retained by the vendor or their employees for recirculation within the local economy of the U.S.A.

EXAMPLE

Patriotic American Shopping Network™

An Internet Website PRODUCT SEARCH COMPONENT provides a list of products matching consumer search criteria, available from one or more vendors for Internet purchase, with the ability to complete purchase online or via other media, as described above.

a. An Internet Website Search Box will be displayed to allow entry and processing of consumer search criteria to locate matching products.

b. The Internet Website PRODUCT SEARCH COMPONENT may build the product list based on matching consumer search criteria entered in the Internet Website Search Box, or based on a series of Search Filters, presented as List/Selection Boxes, Category Menus/Submenus, etc., that restrict the matches to specific product lines, vendors, prices ranges, product/vendor ranks, etc.

c. The list of matching products in the Internet Website Product/Vendor Databases will be built and displayed as Internet Webpages with Hyperlinks, providing the ability to select desired products and complete purchase online or via other media, as described above.

d. The list may contain Product Description/Image, Product Price/Rank, and Vendor Name/Rank information, and may be sorted by Price/Rank/Vendor.

e. The Internet Website Product/Vendor Databases may be built, maintained, and accessed locally, using manual data entry or EDI, via a remote Internet Portal, or any combination of these or other methods, as agreed to by Vendors wishing to participate in the PATRIOTIC AMERICAN SHOPPING NETWORK™ service.

f. Product/Vendor Rank information will be provided by an Internet Website PRODUCT RANK COMPONENT.

g. Product Purchase information will be provided by an INTERNET WEBSITE PRODUCT PURCHASE COMPONENT.

The PRODUCT RANK COMPONENT provides the rank of Products/Vendors selected by the PRODUCT SEARCH COMPONENT, according to the percentage of overall or product-specific sales revenue, from consumer product purchases, that will be retained by the vendor or their employees for recirculation within the local economy of the U.S.A. . . . .

a. The rank of matching Products/Vendors in the Internet Website Product/Vendor/Rank Databases will be integrated into the list built and displayed as Internet Webpages with Hyperlinks by the PRODUCT SEARCH COMPONENT, as Product/Vendor Rank information.

b. The Product/Vendor Rank information may be presented as a numerical/graphical representation of the percentage of overall or product-specific sales revenue, from consumer product purchases, that will be retained by the vendor or their employees for recirculation within the local economy of the U.S.A. For example, a graphical representation of the Rank may take the form of one or more miniature American Flag icons, on a scale of zero (0) to twenty (20), more particularly zero (0) to five (5), representing the anticipated value of the Product/Vendor consumer purchase to the local economy of the U.S.A. An American vendor with American employees offering products made in America from only American components may merit a 5-Flag Rank. Products partially made from imported components may only merit a 4-Flag Rank, etc.

c. The Product/Vendor Rank may be assigned based on information provided by the participating Vendors, independent research/validation by the PATRIOTIC AMERICAN SHOPPING NETWORK™ service, or any combination of these or other methods, as agreed to by Vendors wishing to participate in the PATRIOTIC AMERICAN SHOPPING NETWORK™ service.

d. The Internet Website Product/Vendor/Rank Databases may be built, maintained, and accessed locally, using manual data entry or EDI, via a remote Internet Portal, or any combination of these or other methods, as agreed to by Vendors wishing to participate in the PATRIOTIC AMERICAN SHOPPING NETWORK™ service.

The PRODUCT PURCHASE COMPONENT provides a means of purchasing products, chosen from the list of products built and displayed as Internet webpages with Hyperlinks by the PRODUCT SEARCH COMPONENT, via online or other media.

a. Selection of an Internet Webpage Product Hyperlink will result in the display of an Internet Website Product Purchase Page, which will present additional product and purchasing information and allow the consumer to order the desired products for purchase.

b. Products chosen for purchase will be stored in an Internet Website Product Order Database.

c. The Product Purchase information may be presented as a local or remote Internet Website Page, providing the consumer with the ability to complete purchase online or via other media, such as retail store, postal mail, electronic mail, television or telephone promotions.

d. The Internet Website Product Order Database may be built, maintained, and accessed locally, using manual data entry or EDI, via a remote Internet Portal, or any combination of these or other methods, as agreed to by Vendors wishing to participate in the PATRIOTIC AMERICAN SHOPPING NETWORK™ service.

In these respects, the PATRIOTIC AMERICAN SHOPPING NETWORK™ according to variants of the present invention substantially departs from the conventional concepts and designs of the prior art, and in so doing provides an apparatus primarily developed for the purpose of offering patriotic American consumers the ability to make an informed purchasing decision, based on both the product price and percentage of overall or product-specific sales revenue, from consumer product purchases, that will be retained by the vendor or their employees for recirculation within the local economy of the U.S.A.

Generally, an Internet-based shopping network according to variants of the invention overcome the shortcomings of the prior art networks and systems. Generally, an Internet-based shopping network according to variants of the invention offer consumers a guide to the percentage of overall or product-specific sales revenue, from consumer product purchases, that will be retained by the vendor or their employees for recirculation within a local economy. Generally, an Internet-based shopping network according to variants of the invention offer consumers the ability to make an informed purchasing decision, based on both the product price and percentage of overall or product-specific sales revenue, from consumer product purchases, that will be retained by the vendor or their employees for recirculation within a local economy. Generally, an Internet-based shopping network according to variants of the invention offer consumers local products which may be more cost-effective in the long-term relative to foreign products because, for example, foreign products may not conform to the quality and safety standards expected from local products. Also, purchase of local products may allow local producers, manufacturers and businesses to remain in business.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A system for providing information to a consumer, comprising:
   a processor;
   a memory accessible by the processor;
   the processor configured to:
      provide an interactive website with a means for a consumer to search products for sale over the Internet, the products selected from a plurality of predetermined vendors stored in the memory, the vendors offering the products for sale;
      provide a results page generated by the processor wherein each identified product resulting from a consumer search is displayed in a list, the list having at least one of a product description, a product image, a product price, a vendor name, or a hyperlink to the vendor; and rank each identified product based on a score generated for the product, the score based on any known manufacturers, distributors and vendors associated with the product;
   wherein each of the manufacturers, distributors and vendors has a percentage membership in the local economy; and
   assign a sub-score to each of the manufacturers, distributors and vendors based on the percentage membership in the local economy and the score is generated based on a function of the sub-scores.

2. The system of claim 1, wherein the processor is configured to effectuate a purchase of an identified predetermined product via the corresponding hyperlink.

3. The system of claim 1, wherein the processor is configured such that when providing the results page, the ranking corresponding to the identified predetermined product offered by the predetermined vendor, is displayed as a graphical or a numerical ranking, and the ranking is displayed adjacent the identified predetermined product.

4. The system of claim 3, wherein the graphical ranking comprises a series of one or more American flags.

5. The system of claim 1, wherein the processor is configured to provide a list of products matching consumer search criteria available from one or more vendors for Internet purchase, the list provided in response to a search query;
   provide a ranking for each identified predetermined products in the list based on at least one of (i) a percentage of overall sales revenue or (ii) product-specific sales revenue, from consumer product purchases, wherein the revenue is retained by the vendor or employees of the vendor for recirculation within a local economy; and
   provide a means to purchase predetermined products in the list.

6. The system of claim 5, further comprising a local or remote vendor database and a local or remote product database, the vendor and product databases having data corresponding to at least one of (i) the percentage of overall sales revenue or (ii) product-specific sales revenue, from consumer product purchases, wherein the revenue is retained by the vendor or employees of the vendor for recirculation within the local economy.

7. The system of claim 6, further comprising a local or remote rank database, the processor configured to assign a rank to a vendor or a product within the vendor and product databases based on data corresponding to at least one of (i) the percentage of overall sales revenue or (ii) product-specific sales revenue, from consumer product purchases, wherein the revenue is retained by the vendor or employees of the vendor for recirculation within the local economy.

8. A system for providing information to a consumer, comprising:
   a processor;
   a memory accessible by the processor;
   the processor configured to:
      provide an interactive website with a means for a consumer to search products for sale over the Internet, the products selected from a plurality of predetermined vendors stored in the memory, the vendors offering the products for sale;
      provide a results page generated by the processor wherein each identified product resulting from a consumer search is displayed in a list, the list having at least one of a product description, a product image, a product price, a vendor name, or a hyperlink to the vendor; and
      rank each identified product based on a score generated for the product, the score based on any known manufacturers, distributors and vendors associated with the product;
   wherein each of the manufacturers, distributors and vendors has a percentage of the labor from the local economy and a percentage of owners from the local economy;
   wherein each manufacturer has a percentage of the product material used in the product that originated in the local economy;
   assign a sub-score to each of the manufacturers, distributors and vendors based on the labor, ownership and product material percentages membership in the local economy; and
   wherein the score is generated based on a function of the sub-scores.

9. The system of claim 8, wherein the processor is configured to effectuate a purchase of an identified predetermined product via the corresponding hyperlink.

10. The system of claim 8, wherein the processor is configured such that when providing the results page, the ranking corresponding to the identified predetermined product offered by the predetermined vendor, is displayed as a graphical or a numerical ranking, and the ranking is displayed adjacent the identified predetermined product.

11. The system of claim 10, wherein the graphical ranking comprises a series of one or more American flags.

12. The system of claim 8, wherein the processor is configured to provide a list of products matching consumer search criteria available from one or more vendors for Internet purchase, the list provided in response to a search query;
   provide a ranking for each identified predetermined products in the list based on at least one of (i) a percentage of overall sales revenue or (ii) product-specific sales revenue, from consumer product purchases, wherein the revenue is retained by the vendor or employees of the vendor for recirculation within a local economy; and provide a means to purchase predetermined products in the list.

13. The system of claim 12, further comprising a local or remote vendor database and a local or remote product database, the vendor and product databases having data corresponding to at least one of (i) the percentage of overall sales revenue or (ii) product-specific sales revenue, from consumer product purchases, wherein the revenue is retained by the vendor or employees of the vendor for recirculation within the local economy.

14. The system of claim 13, further comprising a local or remote rank database, the processor configured to assign a rank to a vendor or a product within the vendor and product databases based on data corresponding to at least one of (i) the percentage of overall sales revenue or (ii) product-specific sales revenue, from consumer product purchases, wherein the revenue is retained by the vendor or employees of the vendor for recirculation within the local economy.

* * * * *